United States Patent
Matoba

(10) Patent No.: US 6,754,438 B1
(45) Date of Patent: *Jun. 22, 2004

(54) INFORMATION REPRODUCING APPARATUS

(75) Inventor: Hiroshi Matoba, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,940

(22) Filed: Oct. 22, 1997

(30) Foreign Application Priority Data

Oct. 25, 1996 (JP) ............................................. 8-283978

(51) Int. Cl.$^7$ ................................................ H04N 5/91
(52) U.S. Cl. ...................................... 386/95; 386/125
(58) Field of Search ............................... 386/1, 39, 45, 386/68, 69, 70, 81, 82, 105, 106, 96, 83, 95, 125; 360/69, 72.1, 72.2; 348/7; 725/110, 112, 136, 500.1; 345/520–521

(56) References Cited

U.S. PATENT DOCUMENTS

| | | | |
|---|---|---|---|
| 4,677,466 A | | 6/1987 | Lert, Jr. et al. |
| 5,353,121 A | | 10/1994 | Young et al. |
| 5,488,409 A | * | 1/1996 | Yuen et al. ................. 386/83 |
| 5,541,738 A | * | 7/1996 | Mankovitz ................. 386/83 |
| 5,613,032 A | * | 3/1997 | Cruz et al. ................. 386/69 |
| 5,737,552 A | * | 4/1998 | Lavallee et al. ......... 725/500.1 |
| 5,818,441 A | * | 10/1998 | Throckmorton et al. ..... 725/136 |
| 5,907,658 A | * | 5/1999 | Murase et al. ............. 386/95 |
| 5,953,073 A | * | 9/1999 | Kozina et al. ............... 386/1 |
| 6,081,750 A | * | 6/2000 | Hoffberg et al. ........... 345/520 |
| 6,091,886 A | * | 7/2000 | Abecassis ................. 386/83 |

FOREIGN PATENT DOCUMENTS

| | | |
|---|---|---|
| EP | WO 92 07360 | 4/1992 |
| EP | 0 581 601 A1 | 2/1994 |
| EP | 0 608 960 A1 | 8/1994 |
| EP | 0 692 790 A2 | 1/1996 |
| JP | 3-291077 | 12/1991 |
| JP | 10 51752 | 2/1998 |
| WO | WO 94 16441 | 7/1994 |

OTHER PUBLICATIONS

"Real Time Video Scene Detection Based on Shot Sequence Encoding", Nagasaki, Miyatake (Central Research Laboratory, Hitachi Ltd, Tokyo) UEDA (Research & Development Laboratory, Hitachi Denshi Ltd, Tokyo, 187, Japan).
Patent Abstracts of Japan, vol. 018, No. 275 (E–1553), May 25, 1994 & JP 06 046366 A (Victor Co of Japan Ltd), Feb. 18, 1994.

* cited by examiner

Primary Examiner—Thai Tran
Assistant Examiner—Christopher Onuaku
(74) Attorney, Agent, or Firm—Foley & Lardner LLP

(57) ABSTRACT

An information reproducing apparatus comprising a program storage device 11 for storing a program, a program information outputting device 13 for generating and outputting program information on the basis of information which is recorded together with the program in the program storage device 11, and a program-associated information reproducing device 15 for selecting suitable program-associated information according to the program information, and reproducing a suitable portion of the program-associated information according to the program information. According to the information reproducing apparatus of the present invention, a TV program broadcasted by a broadcast station or the like and program-associated information which is generated in association with the program by the broadcast station itself or a third party other than the broadcast station can be received by viewership while the program-associated information stored in PC or the like is reproduced in synchronism with the reproduction of the TV program recorded in VCR or the like.

20 Claims, 8 Drawing Sheets

F I G. 8
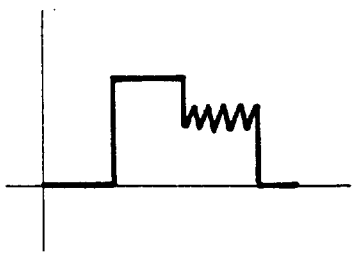
F I G. 9
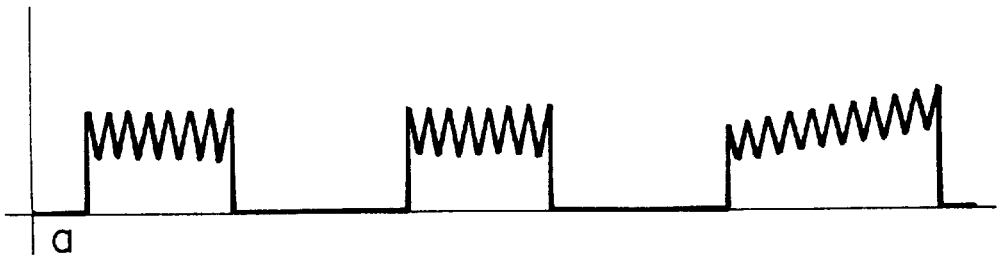
F I G. 10
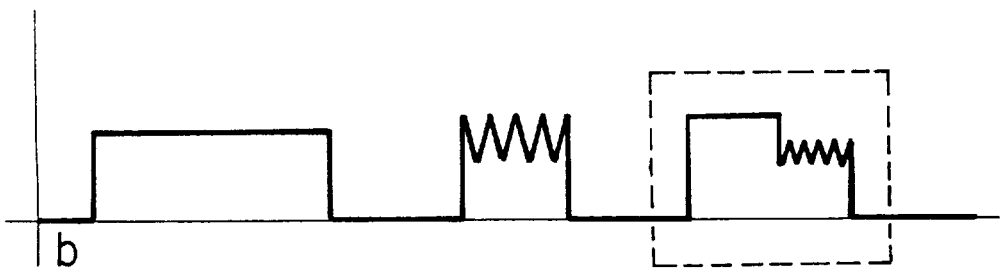
F I G. 11
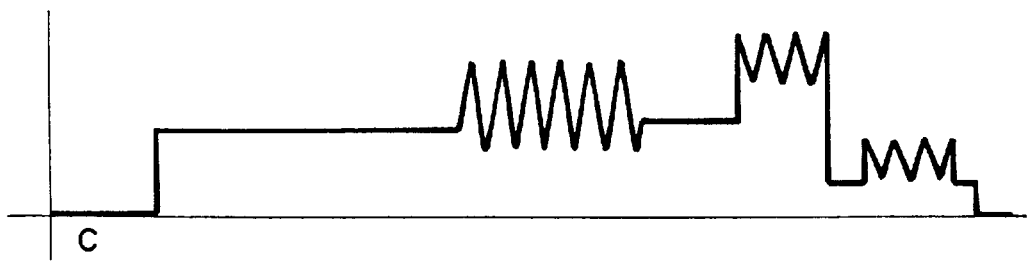

INFORMATION REPRODUCING APPARATUS

BACKGROUND OF THE INVENTION

1. Field of the Invention

The present invention relates to an apparatus and a method for reproducing and displaying program-associated information in synchronism with a TV (television) program which is reproduced by a program storing device such as VCR in a system which comprises a TV program storing device such as VCR and/or a data information displaying device such as PC (personal computer).

2. Description of the Related Art

As one of conventional methods for reproducing the program-associated information in synchronism with a TV program, there was a method which comprises embedding data of program-associated HTML file in vertical blanking interval of a TV signal in a broadcast station, transmitting the TV signal from a broadcast station, receiving the TV signal by a PC-based receiver, separating the data of program-associated HTML, and displaying the data of HTML file in synchronism with a TV program on a display of PC.

However, in the conventional method as described above, if there is an intervention of VCR between a broadcast station and PC, it is impossible to display the data of HTML file with synchronism with a TV program because of the loss of the data of HTML file in VCR. A part of the data of HTML file in vertical blanking interval is lost at switching position between a field and another.

Further, the above problem makes it difficult for a third party such as IP (information provider) to provide the program-associated information. In general, IP cannot know the contents of a TV program in advance, and thus IP provides program-associated information subsequently to the broadcast of the TV program. In order to synchronously reproduce the program-associated information and the TV program in a home for example, the TV broadcasting program must be temporarily recorded in a program storage device such as a VCR or the like. However, there has not been hitherto provided any method for synchronously reproducing TV programs stored in the VCR or the like and the program-associated information supplied from IP.

SUMMARY OF THE INVENTION

The object of the present invention is to provide an apparatus and a method for reproducing and displaying the program-associated information in synchronism with a TV program which is reproduced by a program storing device such as VCR in a system which comprises a TV program storing device such as VCR and/or a data information displaying device such as PC.

According to the present invention, there is provided an information reproducing apparatus which comprises a program storage device for storing programs, a program information output device for generating and outputting program information containing program ID information, in-program time information, etc. on the basis of information which is stored together with the programs in the program storage device, and a program-associated information reproducing device for selecting suitable program-associated information according to the program ID information and reproducing a suitable portion of the program-associated information according to the in-program time information.

BRIEF DESCRIPTION OF THE DRAWINGS

FIG. 8 shows an example of a partial audio pattern;

FIG. 9 shows a first example of an overall audio pattern;

FIG. 10 shows a second example of the overall audio pattern;

FIG. 11 shows a third example of the overall audio pattern;

DESCRIPTION OF PREFERRED EMBODIMENTS

Figure 1:
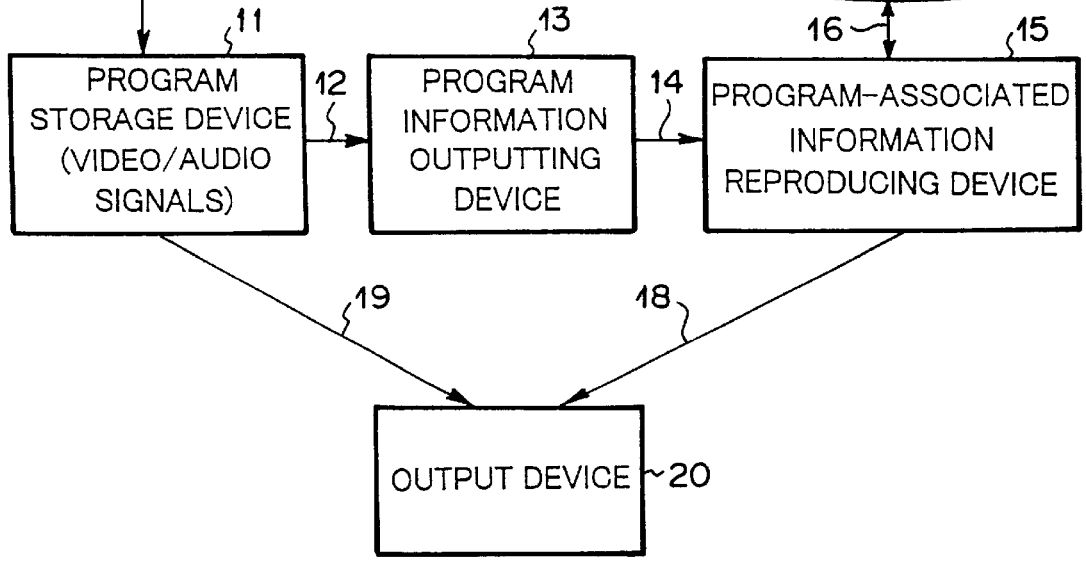
FIG. 1 is a diagram showing first to fifth embodiments of the information reproducing apparatus according to the present invention.

Preferred embodiments according to the present invention will be described hereunder with reference to the accompanying drawings.

First, the preferred embodiments of the present invention will be briefly explained with reference to FIG. 1.

Reference numeral 11 represents a program storage device such as VCR or the like. For example, a video portion and an audio portion of broadcasted TV signals are recorded and stored in program storage device 11. Further Reference numeral 12 represents a transmission path for transmitting an audio signal, a video signal or a control-signal which is output from the program storage device 11.

Reference numeral 13 represents the program information outputting device for generating program information such as program ID information of a program being currently reproduced in the program storage device 11 and in-program time information representing which portion in the program is being reproduced on the basis of the signal from the transmission path 12, and for outputting the program information to program-associated information reproducing device 15. Program information outputting device 13 may be constructed by a software which operates on a PC, and it maybe constructed integrally with program storage device 11.

Reference numeral 14 represents a transmission path for transmitting the program information such as the program ID information, the in-program time information, etc. which are generated by the program information outputting device 13.

Reference numeral 17 represents a storage device, and serves to store program-associated information supplied from the external. Storage device 17 may be constructed by a PC data storage device such as a hard disc or the like. Storage device 17 may be separated from the other units represented by the block diagrams of FIG. 1 and constructed by a server device at a remote place. In this case, transmission path 16 may be constructed by a telephone line or the like.

Link 16 represents a transmission path for transmitting to the program-associated information reproducing apparatus the program-associated information stored in storage device 17.

Reference numeral 15 represents a program-associated information reproducing device for reproducing the program-associated information stored in storage device 17. On the basis of the program ID information on the transmission path 14, program-associated information reproducing device IS first selects the corresponding program-associated information from plural pieces of program-associated information stored in storage device 17, and determines on the basis of the in-program time information on the transmission path 14 which portion in the program-associated information is reproduced. The program-associated information reproducing device 15 may be constructed by a software which operates on the PC, and the program information outputting device 13 and the program-associated information reproducing device 15 may be constructed to operate on the same PC.

Link 18 represents a transmission path for transmitting video and audio signals which are obtained by reproducing program-associated information in program-associated information reproducing device 15.

Link 19 represents a transmission path for transmitting video and audio signals of programs which are output from the program storage device 11.

Reference numeral 20 represents an output device for outputting the video and audio data of the transmission paths 18 and 19 at the same time. For example, the output device 20 may be constructed by arranging two CRT monitors, or by one TV monitor having a function of receiving signals from the two paths 18, 19 and integrally displaying these signals on one frame.

Further, the output device 20 may be constructed as an output device serving as a part of the PC.

There is a method of using auxiliary information when program information outputting device 13 generates program information such as program ID information, in-program time information, etc. The following five modes on the treatment of the auxiliary information may be used.

In a first mode, no auxiliary information is used. This mode may be used when the transmission contents of transmission path 12 is identical to that of transmission path 14, or the information of transmission path 14 can be generated from the information of transmission path 12 without using any auxiliary information. For example, in the case that program ID information and in-program time information are beforehand encoded and embedded in a vertical blanking interval of a TV broadcasting program transmitted from a TV broadcast station in such a format that these information can be directly recorded in a VCR, the program information outputting device 13 can generate the information of the transmission path 14 with no assistance of the auxiliary information by inputting video signals from the transmission path 12 if the program information outputting device 13 has a function of decoding the above information (the program information and the time information). In this case, program ID information and in-program time information may be embedded in a vertical blanking interval except switching position because the amount of information of them is far less than that of HTML file. This mode is shown in FIG. 1.

Figure 2:
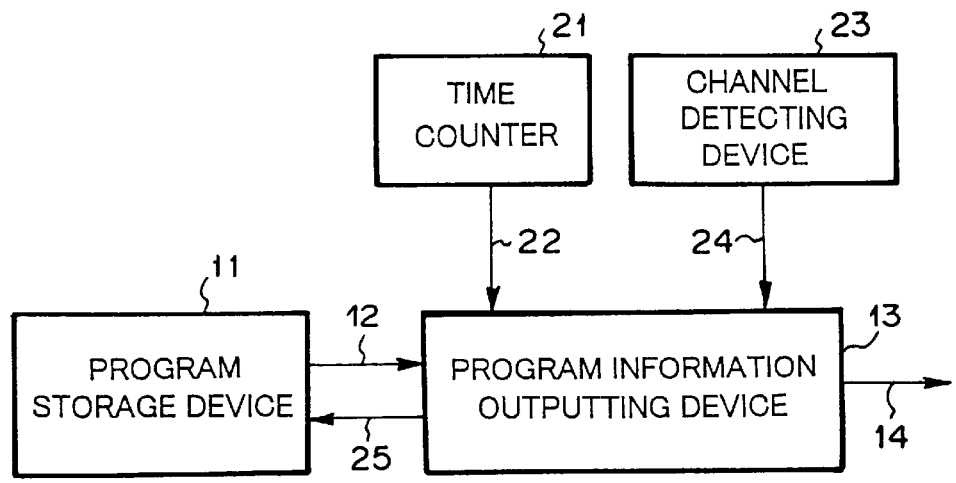
FIG. 2 is a diagram showing a second embodiment of the information reproducing apparatus of the present invention.

The construction of program storage device 11 and the program information outputting device 13 shown in FIG. 1 is modified as shown in FIG. 2 to form a second mode. In this mode, auxiliary information generated at the program storing time is also stored in program storage device 11, and the auxiliary information is also reproduced at the program reproduction time. On the basis of the reproduced auxiliary information, program information outputting device 13 calculates program ID information, in-program time information, etc.

In FIG. 2, reference numeral 21 represents a time counter for counting current time. Link 22 represents a transmission path for transmitting time information output from time counter 21 to program information outputting device 13.

Reference numeral 23 represents a channel detecting device for detecting a channel which is selected during the recording operation of program storage device 11. The information on the channel can be obtained by checking the status of the VCR, monitoring record setting information to the VCR transmitted from a remote controller or the like, or by user's direct specification independently of the setting to the VCR.

Link 24 represents a transmission path for transmitting the channel information from channel detecting device 23 to program information outputting device 13.

Time counter 21 and channel detecting device 23 may be constructed integrally with program storage device 11. Time counter 21 may be replaced by a function which is supplied by the PC. Channel detecting device 23 may be constructed by a software on the PC.

Link 25 represents a transmission path for transmitting auxiliary information as follows. The program information output device 13 converts program information such as program ID information, in-program time information, etc. to auxiliary information which can be recorded together with a program during a recording operation in program storage device 11, and then transmits the auxiliary information thus generated through transmission path 25 to program storage device 11.

In a program reproducing operation, program storage device 11 also reproduces the auxiliary information which has been converted in such a format that it can be recorded in program storing device 11 in the recording operation, and outputs the auxiliary information thus reproduced through transmission path 12 to program information outputting device 13. For example, the auxiliary information is embedded in a vertical blanking interval so that the auxiliary information can be recorded in program storage device 11.

Program storage device 11 records the auxiliary information received from transmission path 25 simultaneously with the recording operation of the program. Transmission paths 12 and 25 maybe constructed by a physically single bi-directional transmission path.

Figure 3:
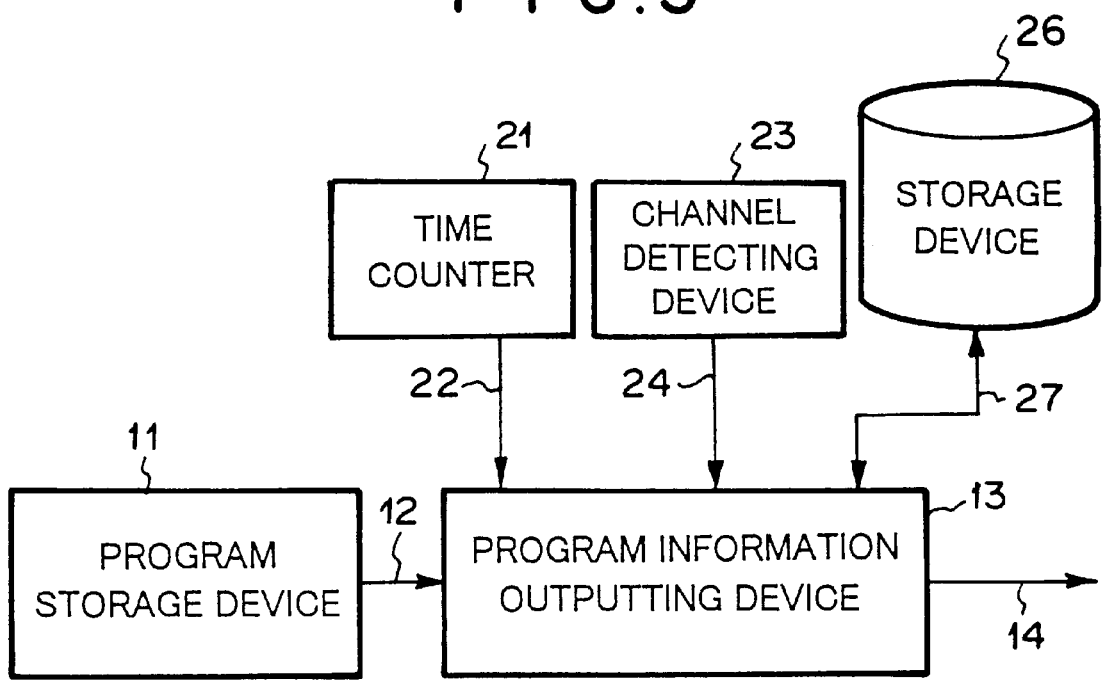
FIG. 3 is a diagram showing a third embodiment of the information reproducing apparatus according to the present invention.

Construction of the program storage device 11 and program information outputting device 13 shown in FIG. 1 may be modified as shown in FIG. 3 to form a third mode.

In FIG. 3, reference numeral 26 represents a storage device for auxiliary information generated by program information outputting device 13 in the program storing operation.

Link 27 represents a transmission path which links program information outputting device 13 and storage device 26. Storage device 26 may be merged to storage device 17. Reference numerals 21 to 24 represent the same units as shown in FIG. 2.

At the same time when program storage device 11 stores a program, program information outputting device 13 obtains the contents of the program. Program information outputting device 13 generates a overall cue signal for a overall program and segment cues for segments of a program divided by time on the basis of closed caption or video and audio data of a program, associates program ID information to the overall cue and in-program time information to segment cues. The pair of an overall cue and program ID information and pairs of segment cue and in-program time information constitutes auxiliary information. Thereafter, Program information outputting device 13 stores auxiliary information in storage device 26. In the reproducing operation, program information outputting device 13 compares the information such as the closed caption, etc. obtained from program storage device 11 with the auxiliary information read out from storage device 26 by a pattern matching method or the like to judge which portion in the auxiliary information corresponds to the information, and generates and outputs the corresponding program information such as the program ID information, the in-program time information, etc.

Figure 4:
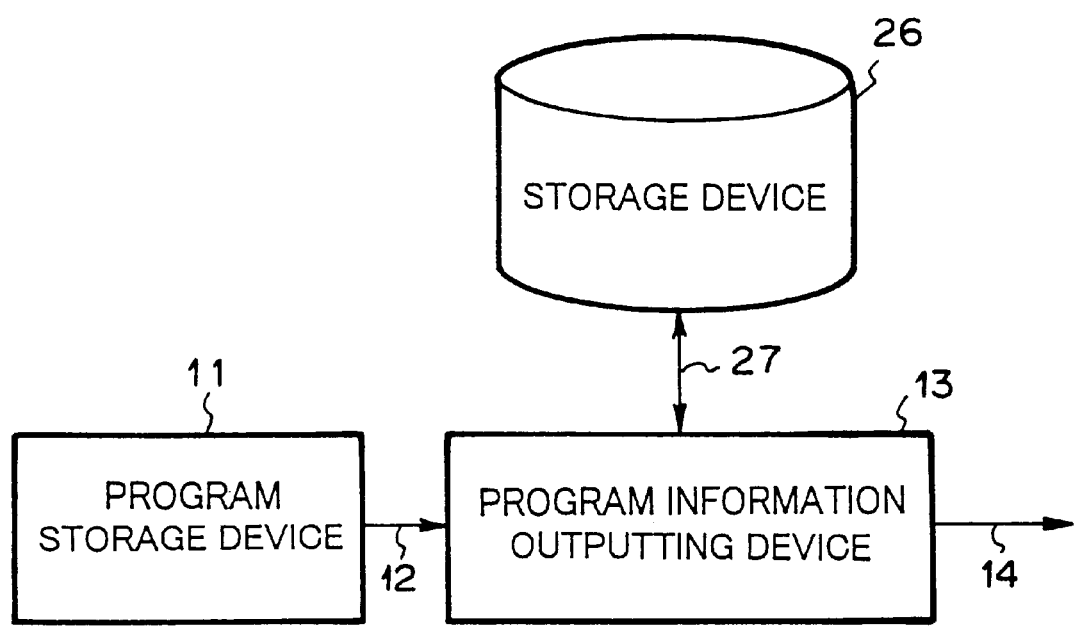
FIG. 4 is a diagram showing a fourth embodiment of the information reproducing apparatus according to the present invention.

The construction of first program storage device 11 and program information outputting device 13 shown in FIG. 1 is modified as shown in FIG. 4 to form a fourth mode. In FIG. 4, storage device 26 and transmission path 27 are the same as those of FIG. 3.

In this embodiment, the auxiliary information generating processing is not performed in the program information outputting device 13 in the program storing operation, and the auxiliary information is generated at the external. The auxiliary information is supplied to storage device 26 from the external at a timing which is independent of the program storing operation, or program information outputting device 13 obtains the auxiliary information from the external and then stores it into storage device 26. In the reproducing operation, the program ID information and the in-program time information are generated in the same procedure as described in the third mode. In this mode, the processing which is required in the recording operation in the third mode can be omitted because the auxiliary information is generated in the external.

In a fifth mode, the construction is the same as that shown in FIG. 1 but the auxiliary information is used.

The auxiliary information generating processing is not performed in the program information outputting device 13 in the program storing operation as in the case of the fourth mode. In the reproducing operation, program information outputting device 13 connects to an external server by using transmission means such as a telephone line or the like to obtain auxiliary information and generates program information such as program ID information and in-program time information referring to auxiliary information thus obtained. On the contrary to the fourth mode requiring the process of obtaining auxiliary information before the reproducing operation, the fifth mode does not need this process until the reproducing operation. In addition, on the contrary to the fourth mode in which the communication for downloading the auxiliary information may be performed at any time from the time when the auxiliary information is prepared at the external and until the reproducing operation is performed in the fourth mode, according to the fifth mode, the communication must be performed during the reproducing.

Figure 5:
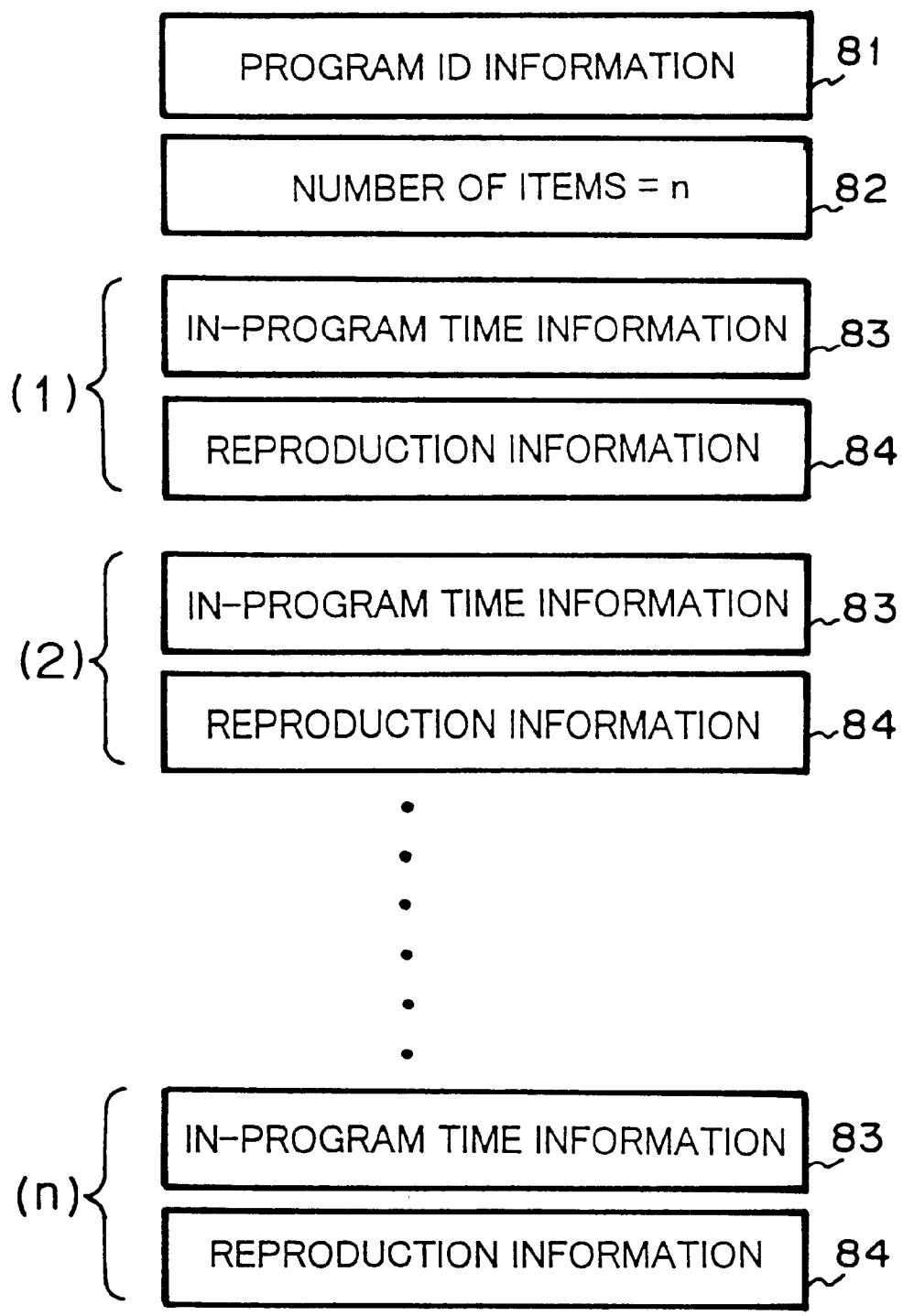
FIG. 5 shows an example of program information of the present invention.

FIG. 5 shows an example of program-associated information which is read by program-associated information reproducing device 15.

In FIG. 5, data 81 represents header information corresponding to program ID information. If there is a code system which can specify a program uniquely, the code of the system can be used as program ID information. Further, information set consisting of program transmission media, channel, storing start time, etc. which can specify the program uniquely may be used as program ID information.

Data 82 describes the total number of sets of in-program time information and reproduction information. Data 83 represents in-program time information.

Data 84 represents reproduction information which specifies the content to be reproduced at the time when the in-program time information 83 is specified. This information contains texts which are described in various formats, figure drawing commands, video file names, etc. The reproduction information 84 may be described by means of hypertext style data (for example, HTML) in which another information is supplied by the operation of inputting by a user, for example, clicking a mouse on a specific item.

Here, an example of the method of generating program ID information 81 and in-program time information 83 with the assistance of the audio signal as a cue.

In this embodiment, program information outputting device 13 and program-associated information reproducing device 15 shown in FIG. 1 are assumed to be implemented by different software on the same PC. The relationship between the constituent elements of the PC, the software on the PC and various information transmitted therebetween when program ID information 81 and in-program time information 83 are generated with the assistance of the audio signal as a cue will be described with reference to FIG. 6.

Reference numeral 151 represents a audio input device in the PC, and audio input device 151 comprises a audio A/D converter and a data buffer. Audio input device 151 is connected to program storage device 11 through the link 12.

Reference numeral 152 represents an input/output device having a network function, a modem function, etc. in the PC to communicate to a remote place. Reference numeral 153 represents a storage device such as a hard disc or the like which is mounted inside the PC or provided outside of the PC, and it is designed to unify storage device 17 shown in FIG. 1 and storage device 26 shown in FIG. 3.

Reference numeral 154 represents an output device in the PC, and outputs video and audio signals to the external. Output device 154 is connected to output device 20 of FIG. 1 through the link 18.

Reference numeral 155 and reference numeral 156 represent programs which operate on the PC. Information generating program 155 is the software corresponding to the function of program information outputting device 13 of FIG. 1, and the information reproducing program 156 is the software corresponding to the function of the program-associated information reproducing device 15.

Reference numeral 161 represents transmission of audio data. Link 162 represents transmission of auxiliary information when the auxiliary information generated by information generating program 155 is stored into storage device 153, and the auxiliary information stored in storage device 153 is referred to by information generating program 155.

Link 163 represents program ID information 81 and in-program time information 83 which are output to information reproducing program 156 by information generating program 155. Link 164 represents transmission of program-associated information which is obtained from storage device 153 by the information reproducing program 156. Link 165 represents transmission of texts, figures, image drawing command, etc. which are issued on the basis of the program-associated information by information reproducing program 156. Link 166 represents transmission of program-associated information and the auxiliary information which are obtained through the input/output device 152 and stored in storage device 153.

Figure 6:
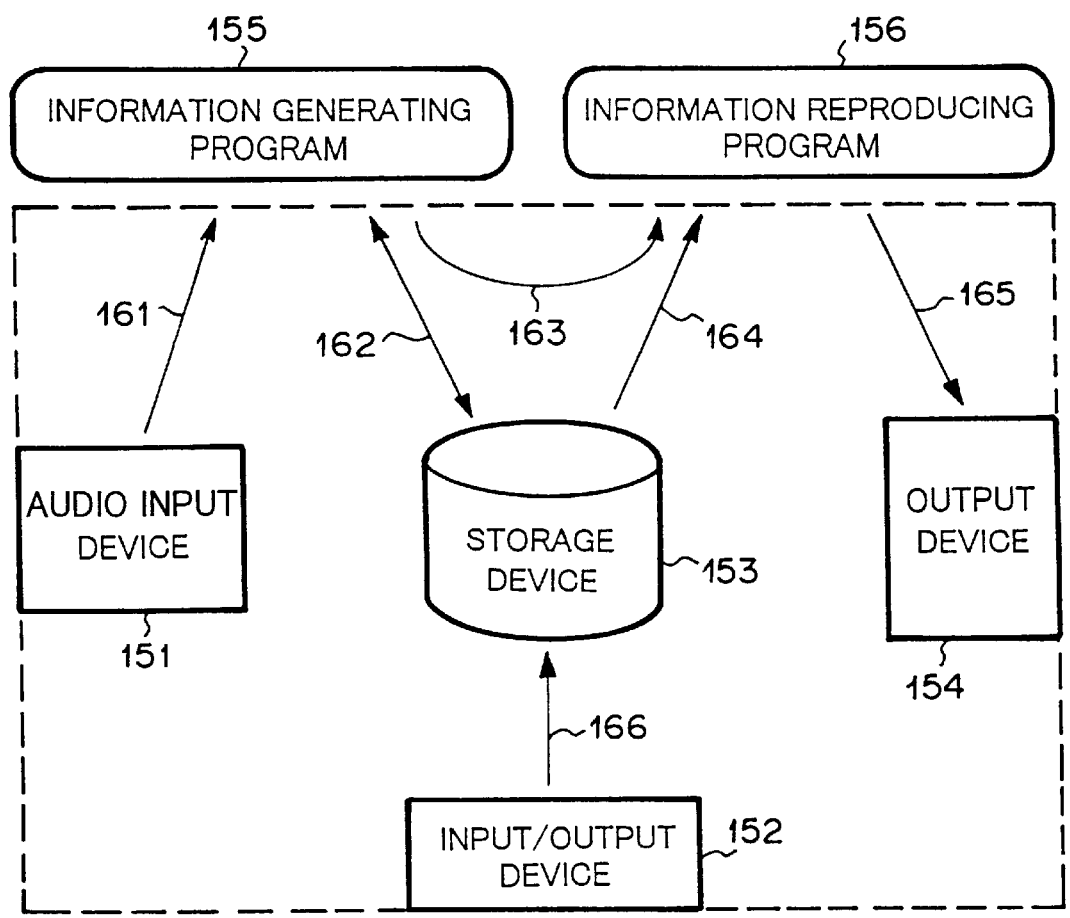
FIG. 6 is a diagram showing the inner construction of a PC, software on the PC and the transmission of each kind of information therebetween when each of the first to fifth embodiments is implemented by a PC.
Figure 7:
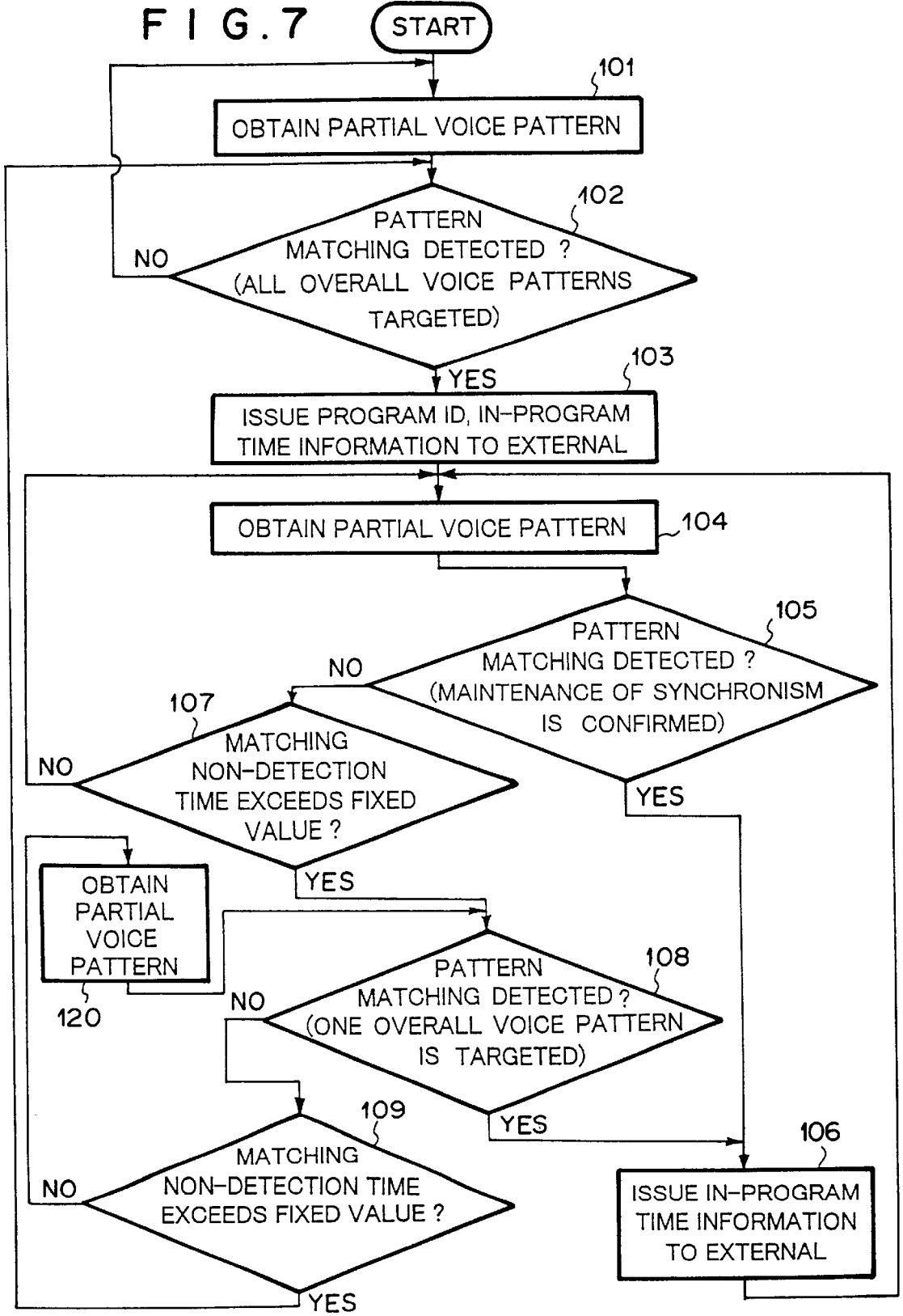
FIG. 7 is a flowchart showing an algorithm for generating program ID information and in-program time information by using audio signals as a cue in the present invention.

FIG. 7 shows an algorithm of generating the program ID information and the in-program time information by information generating program 155 shown in FIG. 6 while VCR is under reproducing operation.

Here, the cue information on the overall program contained in the auxiliary information is hereinafter referred to as "overall audio pattern", and the cue information corresponding to a partial time width which is obtained from VCR at the reproduction time of the VCR is hereinafter referred to as "partial audio pattern".

In FIG. 7, in step 101, audio data having a certain time width are newly obtained from audio input device 151 which corresponds to transmission path 12. This audio data corresponds to "partial audio pattern". In step 102, the pattern matching judgment of the partial audio pattern obtained in step 101 is performed for all the contents of plural overall audio patterns serving as synchronism judgment candidates which has been prepared by information generating program 155 at the program recording time or which are beforehand inputted from the external and stored in storage device 153. If no matching is established for all overall audio patterns, i.e. the judgment in step 102 being No, the process returns to step 101. If the matched portion is detected, i.e. the judgment in step 102 being YES, the process proceeds to step 103. Here, in order to enhance the matching efficiency, the following method may be used. That is, when plural matching candidates are temporarily obtained, but it is not possible to narrow down to one candidate, the judgment in step 102 is temporarily set to No, and the process returns to step 101. When the process goes to step 102 again, a pattern subsequent to the matching candidates which are previously obtained from the overall pattern is preferentially subjected to the matching judgment. This method may be applied in step 108.

In step 103, the program ID information 81 such as the program name, etc. on the program corresponding to a currently inputted audio and the in-program time information 83 on the time corresponding to the content being reproduced in the program are output to the external on the basis of the information obtained in step 102.

Steps 101 to 103 may be omitted when the program ID information, etc. are supplied from the external. In this case, the overall audio pattern which is subjected to the pattern matching in steps 105 and 108 is determined uniquely on the basis of the program ID information 81 which is supplied from the external.

Step 104 is identical to step 101. In step 105, it is judged whether a pattern subsequent to the latest matched portion of the overall audio pattern for which the matching was accomplished in step 102, 105 or 108 matches with a partial audio pattern which is newly obtained at this time, i.e. whether the synchronism being maintained. If the matching is detected, i.e. the judgment in step 105 being YES, the process proceeds to step 106. If not so, i.e. the judgment in step 105 being NO, the process proceeds to step 107. In step 106, the in-program time information 83 which corresponds to the currently reproduced content in the program settled in step 102 is output to the external on the basis of the information obtained in step 105 or 108. In step 107, it is judged whether the continuous time of non-detection in step 105 exceeds a certain time or the frequency of non-detection in step 105 exceeds a certain value. If the judgment in step 107 is YES, the process proceeds to step 108. If not so, i.e. the judgment in step 107 being NO, the process proceeds to step 104. Step 107 is introduced to prevent the process from easily shifting to step 108 which has a relatively high processing load when the judgment of step 105 is not correctly made at a time due to a sudden noise or the like, whereby the processing efficiently can be totally enhanced, and the average time required until the matching is established can be shortened.

Step 108 performs the pattern matching between the current partial audio pattern and the overall audio pattern of the program obtained in step 102. In step 109, it is judged whether the continuous time of non-detection in step 108 exceeds a certain time or the frequency of non-detection in step 108 exceeds a certain value. If the judgment in step 109 is YES, the process proceeds to step 120. If not so, i.e. the judgment in step 107 being NO, the process proceeds to step 102. The operation of step 109 is identical to that of step 107. The operation of step 120 is identical to that of step 101.

In the mode shown in FIG. 7, once the matching is established (the synchronism is established), the judgment of the synchronism maintenance is first performed. If it is judged that the synchronism is not maintained, the matching judgment in the same program is performed. One of the reasons why synchronism breaks is that a VCR goes under special reproduction mode such as stop mode, slow mode, and picture search mode. When the VCR returned to normal reproduction mode again, the reproduction may restarts from a point which is far away from the point to which the previous synchronism had been continued, and thus the every portions of the same program are targeted for the matching. However, in a medium having a sequential access such as a VCR or the like, there is a certain correlation between the time period for which the synchronous state breaks due to the special reproduction and the time difference between the point to which the previous reproduction had been performed and the point from which the reproduction restarts, so that the matching efficiency can be enhanced by utilizing this correlation. For example, in such a condition that only one second has just elapsed from the break of the synchronism, it is most probable that the reproduction at a point near to the final point to which the synchronism had been continued restarts. Therefore, the matching judgement is performed in the corresponding portion of the same program.

When the matching is not established in the same program, the matching judgment is performed on all the programs. The situation by which the program is changed to another is that the reproduction of VCR or the like extends to a next program which is continuously recorded subsequent to the present program, or that a tape is exchanged to another. In this embodiment, the matching judgment processing in the same program is more preferentially performed than the matching judgment processing on all the programs on the assumption that the change of the program as described above is more rarely performed than the shift in the same program due to the special reproduction.

Next, an embodiment of the process of obtaining program ID information 81 and in-program time information 83 by the pattern matching in step 102 of FIG. 7 will be explained.

FIG. 8 shows a diagrammatic picture of an example of the PCM data of the partial audio pattern obtained in the reproduction operation. The ordinate represents a sound level (volume) axis, and the abscissa represents a time axis. Here, it is assumed that there are programs a, b and c as program candidates to be reproduced, and the overall audio patterns of all these programs have been already stored in the storage device 26. FIGS. 9, 10 and 11 schematically show the PCM data of the overall audio patterns of the three kinds of programs a, b and c. In auxiliary information containing the overall audio pattern, program ID information 81 is set as header information. When a code system which can specify any program uniquely exists, the code of the system may be used as the program ID information. Besides, an information set which consists of program transmission media, channel, storing start time, etc. and can specify any program uniquely may be used as the program ID information.

By performing the pattern matching judgment on the overall data contained in FIGS. 9, 10 and 11, it can be found out which portion in the three overall audio patterns is most matched with the partial audio pattern of FIG. 8. In this example, the portion surrounded by a square of FIG. 10 is coincident with the partial audio pattern of FIG. 8. In this case, program ID information 81 of the program b can be obtained from the header information of the overall audio pattern file of program b. Since the abscissa of FIG. 10 shows the time axis, in-program information 83 of the portion surrounded by the square can be obtained.

In the processing which is performed in step 108 of FIG. 7, the target file to be subjected to the pattern matching is limited to one file. In this example, it is the file of program b in FIG. 10.

In order to enhance the matching precision while increasing the matching speed, it is necessary to set the sampling frequency and the quantizing bit number of PCM data to the optimum values. Further, in order to enhance the matching precision, mere PCM data on the time axis are not used as the data format for comparison between data, but plural power data calculated on plural frequency components by using the band pass filters which performs FFT or the like are used.

Even for data which are originally generated from the same program, there is a possibility that the volume level and the steady noise of a audio signal of the overall audio pattern varies from those of the partial audio pattern due to the fluctuation of environments when data are generated or the like. In this case, it is preferable that the difference in level between both the data is corrected or the effect of the steady noise is subtracted when both of the data are used for matching judgement.

According to the method as mentioned above, the synchronization breaks during the special reproduction such as the picture search, and the synchronism is established again at the time point when the normal reproduction restarts. But it is possible to maintain synchronization during the special reproduction as long as an audio signal is supplied. In this case, an audio signal of which time axis is compressed/expanded or reversed must be converted to that of the normal reproduction to be used for matching judgement in step 108.

In the above embodiment, the audio data are targeted. If the audio data pickup processing and the matching judgment processing of the audio data in the embodiment shown in FIG. 7 is replaced by video data pickup processing and matching judgment processing of video data, the pattern matching on video data can be performed. The method of performing the pattern matching of the video data is particularly effectively if it is used for the programs in which variation of audio patterns is little, similar patterns appear frequently, or a non-sound portion continues.

In the case of the matching operation based on pictures, average brightness of continuous fields of pictures is used for matching judgement instead of audio data. Further, in order to enhance the matching precision, plural data set which is composed of average luminance levels or average levels of RGB component for divided areas of a field may be used.

Further, the matching of the audio data and the matching of the video data may be used in combination to enhance the efficiency of the matching. If the audio data pickup processing and the matching judgment processing based on audio data in the embodiment shown in FIG. 7 are respectively replaced by the audio and video data pickup processing and a pair of the matching judgment processing based on audio data and the matching judgment processing based on picture data, the embodiment shown in FIG. 7 can be modified to an embodiment using both audio and picture data.

In this modification, the matching of both of the audio data and picture data is performed at all the time in the matching judgment operation, and if the matching judgment is made on any of audio data and picture data, the matching is regarded as being established. If the matching judgment is made on both of audio data and picture data, the stronger matching judgment result is selected as the final matching result. According to this method, the load of the matching judgment processing is high, however, the average processing procedure until the matching is established can be reduced.

Further, the following method may be used. That is, only the matching judgment on audio data is performed for the first time, and only when the matching is not established, the matching processing of picture data is performed and the processing continues in accordance with the result of the matching processing of picture data. As compared with the forementioned method, this method has a lower processing load because two kinds of processing are not necessarily performed at the same time for the matching judgment, and the procedure until the matching is established can be reduced as compared with the method of using only one of audio data or picture data. The embodiment based on this method can be implemented by modifying steps 102, 105 and 108. Modified step 12 is shown in FIG. 12

Step 201 represents the same step as step 102 of FIG. 7. Step 202 represents a step for performing the processing of step 102 by using video data. The modification of steps 105 and 108 are performed in the same manner as step 102 in FIG. 12.

Figure 12:
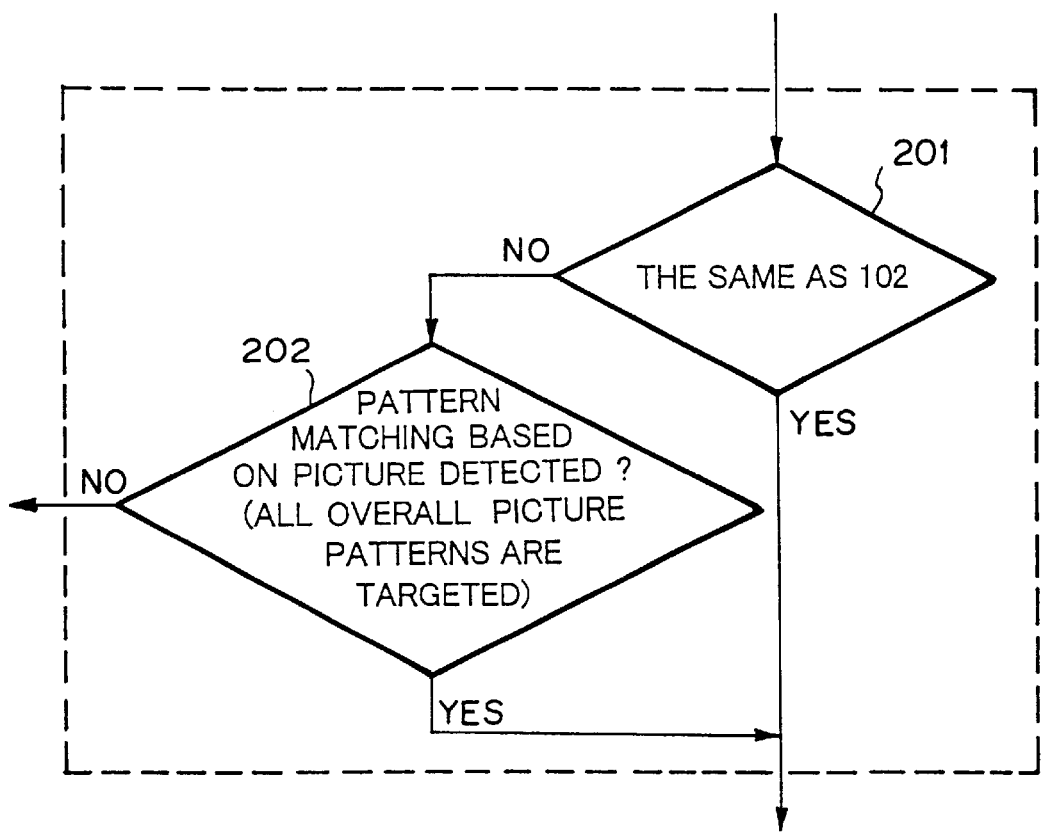
FIG. 12 is a flowchart when the block 102 of FIG. 7 is expanded to processing using video and audio data.

Priority between matching judgement based on audio signal and that based on video signal may be changed by replacing step 201 and step 202 in FIG. 12 each other.

In the embodiment of FIG. 7, the program ID information 81 is notified at the execution time of step 103, which is the time when the reproduced program varies, and the in-program time information 83 is issued every time when step 103 or 106 is performed. As another method, the in-program time information 83 is issued only once when the synchronization is established, and subsequently no in-program time information 83 is issued insofar as the synchronization is kept. In this case, the external program (the information reproducing program 156 of FIG. 6) calculates the in-program time in consideration of the time lapse. In this case, the frequency of the issuance of in-program time information by information generating program 155 to information reproducing program 156 through link 163 of FIG. 3 can be reduced. In this case, by notifying the out-of-synchronism through link 163 when the synchronism is judged to be lost in steps 107 and 109 (the process goes to the direction of NO), the supply of the information by the information reproducing program 156 can be prevented from going ahead arbitrarily in a state where the supply of the information is timely deviated from the reproducing operation of the program storage device 11 of FIG. 1.

Figure 13:
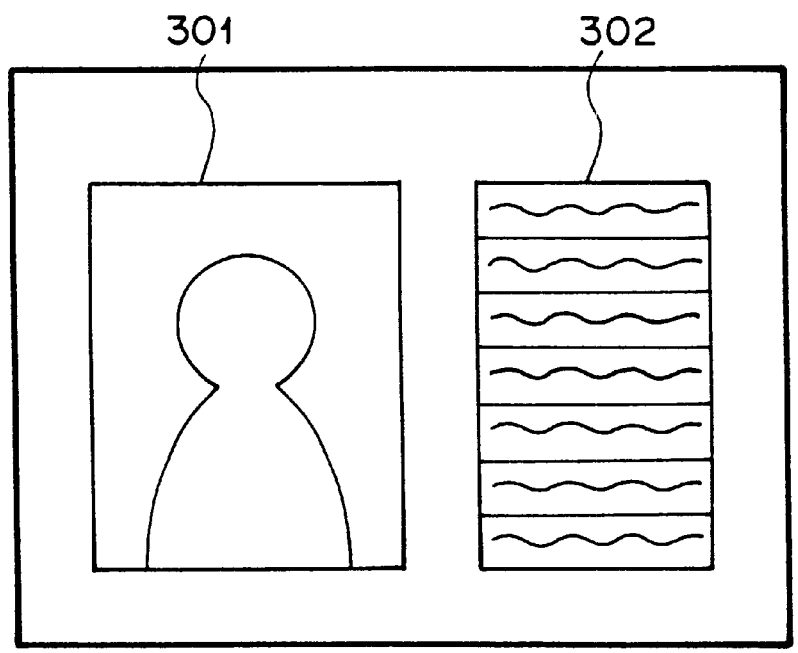
FIG. 13 is a diagram showing a display frame which is displayed by the information reproducing apparatus of the presents invention.
Figure 14:
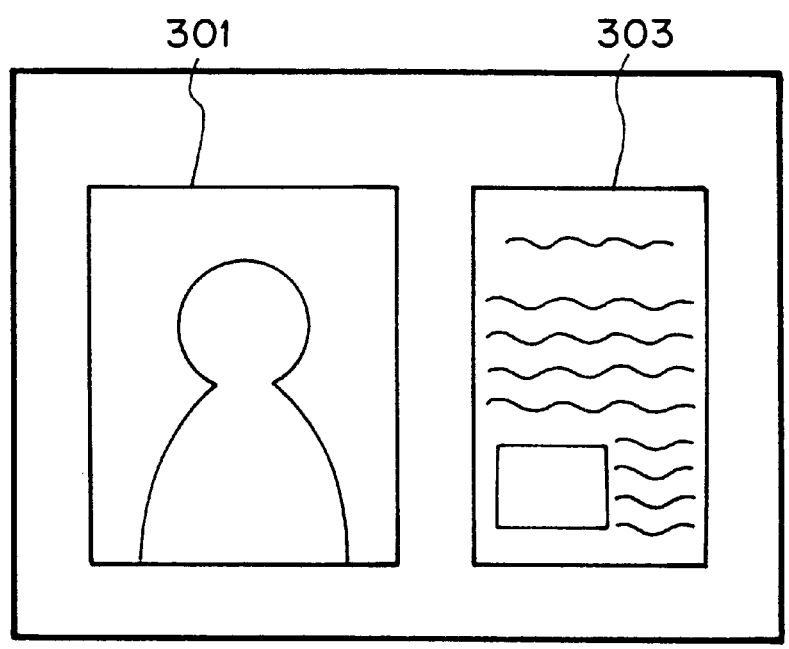
FIG. 14 is a diagram showing another display frame which is displayed by the information reproducing apparatus of the presents invention.

FIGS. 13 and 14 show examples of display frames which are serviced according to the present invention.

FIG. 13 shows an output frame of PC which corresponds to the output device 20 of FIG. 1. In FIG. 13, reference numeral 301 represents a video window which represents an output from program storage device 11. Reference numeral 302 represents a window which is generated by program-associated information reproducing device 15.

In this example, the program storage device 11 reproduces a news program. A list of key words which are associated with the news program is displayed on window 302. Keywords such as technical words, contemporary words, etc. used in the news program are added newly in the list and the list scrolls in synchronism with the progress of the news program displayed on the video window 301.

In this embodiment, the program-associated information data stored in storage device 17 are assumed to have a hypertext structure. FIG. 14 shows a display frame to which the display frame of FIG. 13 is shifted when any item of the keywords list on the window 302 is specified through an input device such as a remote controller or the like by a user.

Reference numeral 303 represents a window for showing the detailed contents of the specified item, and texts or figures are used to show the detailed contents in this embodiment.

According to the information reproducing apparatus of the present invention, a TV program broadcasted by a broadcast station or the like and program-associated information which is generated in association with the program by the broadcast station itself or a third party other than the broadcast station can be received by viewership while the program-associated information stored in PC or the like is reproduced in synchronism with the reproduction of the TV program recorded in VCR or the like.

Further, according to the output system of the program ID information and the in-program time information of the present invention, when a program which is temporarily stored in VCR or the like is reproduced at an arbitrary timing or when special reproduction is performed on the program, information as to which program is currently reproduced and which portion (time) in the program is currently reproduced can be generated by using information such as audio data or the like which are output from the VCR. Such information is used to reproduce the program-associated information in synchronism with the reproduction of the TV program.

What is claimed is:

1. An information reproducing apparatus comprising:
    a program storage device for storing a program;
    a program information outputting device for generating and outputting program information on the basis of information which is recorded together with said program in said program storage device, said program information comprising program ID and in-program time information representing intermediate times in said program; and
    a program-associated contents reproducing apparatus for selecting program-associated contents according to said program information, and reproducing a portion of said program-associated contents according to said program ID and at a timing dictated by said in-program time information, said program-associated contents being stored in other than said program storage device and containing additional program-content separate and distinct from said program information and said program and being other than viewer preference information; program title information; or program guide information;
    wherein said program is supplied to an output device; and
    wherein said program-associated contents are also supplied to said output device in synchronism with and simultaneously with said program and in accordance with said in-program time information.

2. The information reproducing apparatus as claimed in claim 1, wherein:
    said auxiliary information is stored on a recordable medium;
    said program information is calculated using said auxiliary information; and
    said program information is used to synchronize said stored program and said stored suitable portion of said program-associated information.

3. The information reproducing apparatus as claimed in claim 2, wherein:
    said program comprises a television program;
    said program-associated contents comprises data in an HTML file;
    said television program is recorded using a VCR;
    said data in the HTML file is stored digitally; and
    said information reproducing apparatus enables the reproduction of said television program and said data in said HTML file such that the two sources are synchronized through use of said calculated program information and such that the two sources are simultaneously displayed on a split screen of said output device.

4. An information reproducing apparatus comprising:
    a program storage device for storing a program;
    a program information outputting device for generating program information, said program information comprising program ID and in-program time information representing intermediate times in said program; and
    a program-associated contents reproducing apparatus for selecting program-associated contents according to said program ID and at a timing dictated by said in-program time information, and reproducing a portion of said program-associated contents according to said program information, said program-associated contents being stored in other than said program storage device and being other than viewer preference information, program title information, or program guide information, wherein said program-associated contents are supplied to an output device simultaneously with said program and in synchronism with said in-program time information,
    wherein when said program storage device records said program, auxiliary information which is generated by said program information outputting device is recorded together with said program, and when said program storage device reproduces said program, said program storage device reproduces said auxiliary information together with said program, and said program information outputting device calculates said program information on the basis of said auxiliary information reproduced.

5. An information reproducing apparatus comprising:

a program storage device for storing a program;

a program information outputting device for generating program information said program information comprising program ID and in-program time information requesting intermediate times in said program; and a program-associated contents reproducing apparatus for selecting program-associated contents according to said program information and reproducing a portion of said program-associated contents according to said program ID and at a timing dictated by said in-program time information, said program-associated contents being stored in other than said program storage device and containing additional program-content separate and distinct from said program information and said program and being other than viewer preference information, program title information; or program guide information, wherein said program-associated contents are supplied to an output device in synchronism with and simultaneously with said program in accordance with in-program time information, wherein said program information comprises program ID information and said in-program time information; and wherein when said program storage device records said program, on the basis of the contents of said program, said program information outputting device generates and stores auxiliary information which is subjected to comparison judgment by means of a pattern matching or the like when said program storage device reproduces said program, and when said program storage device reproduces said program, said program information outputting device performs the comparisons judgment between the contents of said program received from said program storage device and said auxiliary information by the pattern matching or the like to calculate said program information.

6. An information reproducing apparatus comprising:

a program storage device for storing a program;

a program information outputting device for generating program information said program information comprising program ID and in-program time information requesting intermediate times in said program; and a program-associated contents reproducing apparatus for selecting suitable program-associated contents according to said program information and reproducing a suitable portion of said program-associated contents according to said program ID and at a timing dictated by said in-program time information, said program-associated contents being stored in other than said program storage device and containing additional program-content separate and distinct from said program information and said program and being other than viewer preference information, program title information or program guide information, wherein said program-associated contents are supplied to an output device simultaneously with said program and in accordance with said in-program time information;

wherein said program information comprises program ID information and said in-program time information and wherein when said program storage device reproduces said program, said program information outputting device performs a comparison judgment between the contents of said program received from said program storage device and auxiliary information which is prepared at the external and is stored, by means of pattern matching or the like to calculate said program information.

7. An information reproducing apparatus comprising:

a program storage device for storing a program;

a program information outputting device for generating program information said program information comprising program ID and in-program time information requesting intermediate times in said program; and a program-associated contents reproducing apparatus for selecting program-associated contents according to said program information and reproducing a portion of said program-associated contents simultaneously with said program and according to said program ID and at a timing dictated by said in-program time information, said program-associated contents being stored in other than said program storage device and containing additional program content separate and distinct from said program information and said program and being other than viewer preference information, program title information or program guide information, wherein said program-associated contents are supplied to an output device together with said program, wherein said program information comprises program ID information and said in-program information; and wherein when said program storage device reproduces said program, said program information outputting device performs a comparison judgment between the contents of said program received from said program storage device and auxiliary information which is obtained from the external, by means of pattern matching or the like to calculate said program information.

8. A program generating method, comprising:

generating and storing, during other than a vertical blanking interval, audio signal patterns for reference for one or more programs stored in a program storage device;

selecting one of said audio signal patterns which corresponds to a currently reproduced audio data signal by means of pattern matching;

generating a program information which is associated with said audio signal pattern selected, said program information comprising program ID and in-program time information representing intermediate times in said program; and selecting program-associated contents according to said program information and reproducing a portion of said program-associated contents according to said program ID and at a timing dictated by said in-program time information, said program-associated contents being stored in other than said program storage device and containing additional program-content separate and distinct from said program information and said program and being other than viewer preference information, program title information or program guide information; wherein said program-associated contents are supplied to an in synchronism with and simultaneously with said program and in accordance with said in-program time information.

9. The program information generating method as claimed in claim 8:

wherein:

said one or more programs do not contain timing information enabling synchronization with additional data sources;

each generated audio signal pattern is generated for a particular program and comprises a portion of the particular program for which it is generated; and said program information associated with an audio signal pattern comprises in-program time information, thus enabling synchronization of the particular program with another data source which is separately stored;

further comprising:

associating in-program time information with the currently reproduced audio data signal, wherein said associated in-program time information is part of said program information associated with said audio signal pattern which corresponds to the currently reproduced audio data signal; and synchronizing said currently reproduced audio data signal with an additional data source using said associated in-program time information.

10. A program generating method, comprising:

generating and storing, during other than a vertical blanking interval, video signal patterns for reference for one or more programs stored in a program storage device;

selecting one of said video signal patterns which corresponds to a currently reproduced video data signal by means of pattern matching;

generating a program information which is associated with said video signal pattern selected, said program information comprising program ID and in-program time information representing intermediate times in said program; and selecting program-associated contents according to said program information and reproducing a portion of said program-associated contents according to said program ID and at a timing dictated by said in-program time information, said program-associated contents being stored in other than said program storage device and containing additional program-content separate and distinct from said program information and said program and being other than viewer preference information, program title information or program guide information wherein said program-associated contents are supplied to an output device in synchronism with and simultaneously with said program and in accordance with said in-program time information.

11. The program information generating method as claimed in claim 10, wherein:

said one or more programs do not contain timing information enabling synchronization with additional data sources;

each generated video signal pattern is generated for a particular program and comprises a portion of the particular program for which it is generated; and said program information associated with a video signal pattern comprises in-program time information, thus enabling synchronization of the particular program with another data source which is separately stored.

12. The program information generating method as claimed in claim 11, further comprising:

associating in-program time information with said currently reproduced video data signal, wherein said associated in-program time information is part of said program information associated with said video signal pattern which corresponds to said currently reproduced video data signal; and synchronizing said currently reproduced video data signal with an additional data source using said associated in-program time information.

13. The program information generating method as claimed in claim 12, wherein said one or more programs are television programs and are recorded on a VCR, and wherein the method enables synchronization of said particular program with data in an HTML file which is separately stored.

14. A program generating method, comprising:

generating and storing, during other than a vertical blanking interval, audio signal patterns and video signal patterns for reference for one or more programs stored in a program storage device;

selecting one of said audio signal patterns which corresponds to a currently reproduced audio data signal by means of pattern matching;

selecting one of said video signal patterns which corresponds to a currently reproduced video data signal by means of pattern matching;

determining a portion in said one or more programs by selecting alternatively said selected audio signal pattern or said selected video signal pattern based on intensity of pattern matching;

generating a program information which is associated with said determined portion, said program information comprising program ID and in-program time information representing intermediate times in said program;

selecting program-associated contents according to said program information and reproducing a portion of said program-associated contents according to said program ID and at a timing dictated by said in-program time information, said program-associated contents being stored in other than said program storage device and containing additional program-content separate and distinct from said program information and said program and being other than viewer preference information, program title information or program guide information wherein said program-associated contents are supplied to an output device in synchronism with and simultaneously with said program in accordance with said in-program time information.

15. A program information generating method, comprising:

generating and storing, during other than a vertical blanking interval, audio signal patterns and video signal patterns for reference for one or more programs;

selecting one of said audio signal patterns which corresponds to a currently reproduced audio data signal by means of pattern matching of said audio patterns without regard to said video patterns;

selecting one of said video signal patterns which corresponds to a currently reproduced video data signal by means of pattern matching of said video patterns without regard to said audio patterns;

determining a portion in said one or more programs by preferentially selecting the result of said audio signal pattern selection and secondly selecting the result of said video signal pattern selection; and generating a program information which is associated with said determined portion;

wherein said video signal pattern selection may be omitted when the result of said audio signal pattern selection is definite.

16. A program information generating method, comprising:

generating and storing, other than a vertical blanking interval, audio signal patterns and video signal patterns for reference for one or more programs;

selecting one of said video signal patterns which corresponds to a currently reproduced video data signal by means of pattern matching of said video patterns without regard to said audio patterns;

selecting one of said audio signal patterns which corresponds to a currently reproduced audio data signal by means of pattern matching of said audio patterns without regard to said video patterns;

determining a portion in said one or more programs by preferentially selecting the result of said video signal pattern selection and secondly selecting the result of said audio signal pattern selection; and generating a program information which is associated with said determined portion;

wherein said audio signal pattern selection may be omitted when the result of said video signal pattern selection is definite.

17. An information reproducing apparatus which comprises:

a program storage device for storing a program;

means for generating auxiliary information which consists of program ID information and in-program time information which are associated with the program;

means for embedding the auxiliary information in the program when the program is stored in said program storage device, said auxiliary information recorded during other than a vertical blanking interval;

means for obtaining the program ID and in-program time information associated with the program when the program is reproduced from said program storage device, said in-program time information representing intermediate times in said program; and a program-associated contents reproducing apparatus for selecting and reproducing program-associated contents corresponding to the program ID and at a timing dictated by said in-program time information, said program-associated contents being stored in other than said program storage device and being other than viewer preference information, program title information or program guide information wherein said program-associated contents are supplied to an output device in synchronism with and simultaneously with said program in accordance with said in-program time information.

18. An information reproducing apparatus which comprises:

a program storage device for storing a program;

means for generating an overall cue signal for the whole of the program and segment cues for segments of the program divided by time on the basis of closed caption or video and audio data of the program;

means for generating auxiliary information which consists of a pair of program ID information and the overall cue associated therewith and pairs of in-program time information and the segment cue associated therewith, said in-program time information representing intermediate times in said program and said auxiliary information recorded during other than a vertical blanking interval;

an auxiliary information storage device for storing the auxiliary information which is supplied from said means for generating auxiliary information when the program is stored in said program storage device;

means for obtaining the program ID and in-program time information associated with the program reproduced from said program storage device by comparing contents of the program reproduced from said program storage device with the overall cue and segment cues with pattern matching method; and a program-associated contents reproducing apparatus for selecting and reproducing program-associated contents corresponding to the program ID and at a timing dictated by said in-program time information, said program-associated contents being separate and distinct from said program and said auxiliary information and being other than viewer preference information, program title information or program guide information wherein said program-associated contents are supplied to an output device in synchronism with and simultaneously with said program in accordance with said in-program time information.

19. An information reproducing apparatus which comprises:

a program storage device for storing a program;

an auxiliary information storage device for storing an auxiliary information which consists of a pair of program ID information and an overall cue associated therewith and pairs of in-program time information and a segment cue associated therewith, said in-program time information representing intermediate times in said program, said auxiliary information being supplied from external, said auxiliary information recorded in other than a vertical blanking interval, said overall cue being prepared for the whole of the program, said segment cues being prepared for segments of the program divided by time on the basis of closed caption or video and audio data of the program;

means for obtaining the program ID and in-program time information associated with the program reproduced from said program storage device by comparing contents of the program reproduced from said program storage device with the overall cue and segment cues with pattern matching method; and a program-associated contents reproducing apparatus for selecting and reproducing program-associated contents corresponding to the program ID and at a timing dictated by said in-program time information, said program-associated contents being separate and distinct from said program and said auxiliary information and being other than viewer preference information, program title information or program guide information wherein said program-associated contents are supplied to an output device in synchronism with and simultaneously with said program in accordance with said in-program time information.

20. An information reproducing apparatus which comprises:

a program storage device for storing a program;

an auxiliary information inputting device for inputting an auxiliary information which consists of a pair of program ID information and an overall cue associated therewith and pairs of in-program time information and a segment cue associated therewith, said auxiliary information being supplied from external in real-time with the reproduction of the program from said program storage device, said auxiliary information recorded during other than a vertical blanking interval, said overall cue being prepared for the whole of the program, said segment cues being prepared for segments of the program divided by time on the basis of closed caption or video and audio data of the program;

means for obtaining the program ID and in-program time information associated with the program reproduced from said program storage device by comparing contents of the program reproduced from said program storage device with the overall cue and segment cues with pattern matching method, said in-program time information representing intermediate times in said program; and a program-associated contents reproducing apparatus for selecting and reproducing program-associated contents corresponding to the program ID and at a timing dictated by said in-program time information, said program-associated contents being separate and distinct from said program and said auxiliary information and being other than viewer preference information, program title information or program guide information wherein said program-associated contents are supplied to an output device in synchronism with and simultaneously with said program in accordance with said in-program time information.

\* \* \* \* \*